United States Patent [19]

Vorob'iev et al.

[11] Patent Number: 5,204,309
[45] Date of Patent: Apr. 20, 1993

[54] CATALYSTS FOR NEUTRALIZING AIR AND GASEOUS EXHAUSTS

[75] Inventors: Vladimir N. Vorob'iev; Tatjana B. Molodogenjuk, both of Uzbekistan, U.S.S.R.

[73] Assignee: TPCT Chemicals, Inc., Seattle, Wash.

[21] Appl. No.: 814,933

[22] Filed: Dec. 30, 1991

[51] Int. Cl.$^5$ .................. B01J 21/04; B01J 21/06; B01J 23/26; B01J 23/78
[52] U.S. Cl. .................. 502/306; 502/309; 502/318; 502/524
[58] Field of Search .............. 502/306, 309, 318, 524

[56] References Cited

U.S. PATENT DOCUMENTS

| | | | |
|---|---|---|---|
| 3,870,658 | 3/1975 | Farrauto et al. | 502/318 |
| 4,116,884 | 9/1978 | Hayashi et al. | 502/309 X |
| 4,367,162 | 1/1983 | Fujitani et al. | 252/443 |
| 4,585,625 | 4/1986 | Chadwick et al. | 423/236 |

FOREIGN PATENT DOCUMENTS

| | | |
|---|---|---|
| 3430870 | 2/1986 | Fed. Rep. of Germany . |
| 326977 | 1/1972 | U.S.S.R. . |
| 433665 | 6/1974 | U.S.S.R. . |
| 592436 | 1/1978 | U.S.S.R. . |
| 1471835 | 4/1977 | United Kingdom . |

Primary Examiner—W. J. Shine
Attorney, Agent, or Firm—McAndrews, Held & Malloy

[57] ABSTRACT

A catalyst for neutralizing vapors and aerosols of organic compounds, carbon monoxide, and a variety of other oxidizable materials from an exhaust which contains oxygen. The catalyst has a carrier made either from titanium dioxide and aluminum oxide or from magnesium-aluminum spinel modified with titanium dioxide. The catalyst has a surface film of active components which include copper oxide and copper chromite (or their nickel or cobalt analog) chemically integrated into the carrier surface by Cu-o-Ti and Cr-O-Ti chains (or their nickel or cobalt analog). The catalyst should comprise from about 0.1% to about 15% by weight of copper oxide (CuO), chromium oxide ($Cr_2O_3$), or mixtures of those compounds; from about 5% to about 25% by weight of copper chromite ($CuCr_2O_4$); from about 3% to about 25% by weight titanium dioxide ($TiO_2$); and from about 60% to about 90% by weight of aluminum oxide ($Al_2O_3$), magnesium/aluminum spinel ($MgAl_2O_4$), or mixtures of those compounds. Some or all of the copper ingredients can optionally be replaced with the corresponding nickel or cobalt compounds or mixtures thereof. A method of catalytically treating the impurities of exhausts with the present catalysts (particularly organic compounds), and thus converting them into carbon dioxide and water, is disclosed.

13 Claims, 2 Drawing Sheets

CATALYSTS FOR NEUTRALIZING AIR AND GASEOUS EXHAUSTS

FIELD OF THE INVENTION

This invention relates to catalysts useful for neutralization of air and gaseous industrial exhausts which contain at least some oxygen. (For brevity, both air and industrial exhausts will be referred to in this document by the word "exhausts" alone.)

BACKGROUND OF THE INVENTION

A better way to remove or neutralize the pollutants found in industrial exhaust gases is needed. Among the common pollutants are organic compounds, halogenated organic compounds, carbon monoxide, nitrogen and sulfur oxides, and hydrogen. Three groups of catalysts are known to neutralize organic compound vapors.

Catalysts coated with precious metals are the first such group. Generally, platinum and palladium are used in quantities of 0.1–0.05 weight per cent on carriers such as aluminum oxide. Presently, Soviet industry produces such catalysts in limited quantities. The catalysts of this group are the subject of USSR Certificate of Authorship No. 592,436 naming O. P. Baburova, T. A. Kruzhkova, et al. as authors.

Group 2 of such catalysts includes bulk oxides of copper, chromium, manganese, etc. (A bulk material as identified in this document is a homogeneous material, as opposed to a material supported on a substrate or support made of a different material.)

A typical catalyst of this group is described in U.S.S.R. Patent No. 433,665, issued to Franco Buonomo, Vittorio Fattore, Janfranco Zanoni, and Bruno Notari as the inventors. The catalyst of that patent consists of a mixture of oxides of copper, manganese, nickel, cobalt, and chromium. The patent states that this catalyst is useful to purify combustion engine exhausts which contain carbon monoxide and hydrocarbons, specifically butane ($C_4H_{10}$).

A similar catalyst was proposed by L. D. Kudryavtseva, I. F. Sotnikov, et al. in USSR Certificate of Authorship No. 326977. This catalyst contains manganese, copper, magnesium, calcium and titanium. This catalyst is stated to purify gaseous exhausts by treating butadiene-1,4, halogenated organic compounds, toluene, etc.

The third group of such catalysts includes oxides of copper, chromium, manganese, etc. which are coated on such carriers as aluminum oxide. The catalysts of this group are the least expensive ones.

Each of these prior catalysts has disadvantages. Catalysts of the first group which contain precious metals are expensive and ineffective for removing organic compound aerosols from exhausts.

Catalysts of the second and third groups, which do not contain precious metals, operate at higher temperatures and consume more heat. These catalysts are poisoned by halogens (for example, chlorine), so they are ineffective for purifying gaseous exhausts containing hydrogen halides or halogenated organic compounds.

Existing catalysts accumulate aerosols of resinous and other organic compounds on their surfaces when used for neutralization of gaseous exhausts containing such aerosols. As a result, oxidation occurs irregularly and is accompanied by strong exothermic effects which lead to the overheating of the catalyst to a temperature as high as 1,000° C. Existing catalysts lose their catalytic properties due to irreversible changes in their structure at some temperature between about 450° and 900° C.

Accordingly, one object of the present invention is to provide a catalyst which is useful for neutralization of gaseous exhausts which contain vapors and aerosols of organic and halogenated organic compounds, as well as some oxygen.

An additional object of the invention is to improve the activity of catalysts for oxidizing carbonaceous and other pollutants in exhaust streams.

Another object of the invention is to improve the thermal resistance of catalysts for oxidizing carbonaceous and other pollutants in exhaust streams.

A different object of the invention is to improve the resistance of such catalysts to poisoning by compounds of chlorine or other halogens, sulfur, or nitrogen.

An additional object of the invention is to improve the resistance of catalysts for oxidizing carbonaceous and other pollutants in exhaust streams to deactivation by aerosols of resins and other organic compounds.

Another object of the invention is a catalyst adapted for treating the exhausts of factories which produce and process electrodes for metallurgy.

Still another object of the invention is a catalyst adapted for treating the exhausts of factories which produce and process chemical fibers.

Yet another object of the invention is a catalyst adapted for treating the exhausts of factories which produce and process man-made leather and other plastics.

Yet another object of the invention is a catalyst adapted for treating the exhausts of factories which produce and process varnish or paint.

Another object of the invention is to provide an improved method for treating such exhausts by contacting the exhausts with an improved catalyst.

One or more of these objects, as well as other objects which will become evident to one of ordinary skill in the art who is familiar with the present invention, are contemplated by the present inventors.

SUMMARY OF THE INVENTION

The catalysts of the present invention are based on active metal oxides, such as copper, chromium, and titanium oxides. Alternatively, cobalt or nickel compounds can be used in place of copper compounds. The present catalysts differ from the prior art in that either (a) a mixed oxide of titanium and aluminum or (b) a magnesium-aluminum spinel modified by titanium dioxide is used as a carrier. The catalyst further differs in that its active components are in the form of a surface film made of a mixture of copper oxide and chromite, or alternatively cobalt oxide and chromite or nickel oxide and chromite. The film is chemically integrated into the carrier surface by Cu-O-Ti and Cr-O-Ti chains or the analogous chains in which cobalt or nickel replaces copper.

One aspect of the invention is a composition comprising:

A. from about 0.1% to about 15% by weight of copper oxide ($CuO$), chromium oxide ($Cr_2O_3$), nickel oxide ($NiO$), cobalt oxide ($CoO$), or mixtures of those compounds;

B. from about 5% to about 25% by weight of copper chromite ($CuCr_2O_4$), nickel chromite ($NiCr_2O_4$), cobalt chromite ($CoCr_2O_4$), or mixtures of those compounds;

C. from about 3% to about 25% by weight titanium dioxide (TiO$_2$); and

D. from about 60% to about 90% by weight of aluminum oxide (Al$_2$O$_3$), magnesium/aluminum spinel (MgAl$_2$O$_4$), or mixtures of those compounds.

Alternately, the catalyst composition may be expressed as comprising a carrier and a coating substantially on the surface of the carrier. The coating consists essentially of from about 0.4% to about 75% by weight of CuO, Cr$_2$O$_3$, CoO, NiO, or mixtures of those compounds and from about 25% to about 99.6% by weight of CuCr$_2$O$_4$, CoCr$_2$O$_4$, or NiCr$_2$O$_4$. The carrier consists essentially of from about 3% to about 30% by weight TiO$_2$ and from about 70% to about 97% by weight of Al$_2$O$_3$, MgAl$_2$O$_4$, or mixtures of those compounds.

The previously defined catalyst will at least partially consume at least one feed material selected from the group consisting of carbon monoxide, an organic carbon compound, elemental hydrogen, a nitrogen oxide, and mixtures thereof in gaseous or aerosol form, when the feed material is contacted with the catalyst in the presence of oxygen. Contact at a temperature between about 250° C. and about 480° C. is specifically contemplated.

Yet another aspect of the invention is a method of using the compositions described above as catalysts for at least partially consuming certain feed materials, many of which are air pollutants. To carry out this method, a gas stream to be treated, containing at least one feed material selected from carbon monoxide, organic compounds, elemental hydrogen, a nitrogen oxide, and mixtures thereof in gaseous or aerosol form, is provided. The gas stream is contacted with one of the catalyst compositions in the presence of oxygen at a temperature and at a volumetric rate effective to at least partially consume the feed material and produce at least one product.

As a result of their interaction with the catalyst, the organic compounds and other indicated impurities in the treated exhausts are oxidized by the oxygen in the exhausts to produce harmless carbon dioxide and water and other relatively innocuous products. The catalysts can work in the presence of hydrogen chloride or other hydrogen halides, chlorinated and other halogenated organic compounds, nitrogen, or sulfur compounds.

The invention can be used to decompose, and thus neutralize, air pollutants in the exhausts of industrial plants which produce varnish, enamel, paint, glass-reinforced plastic, synthetic fiber, manmade leather, electric cable, plastic, rubber, electrodes for metallurgy, and a wide range of other materials and products.

DETAILED DESCRIPTION OF THE INVENTION

Figure 1:
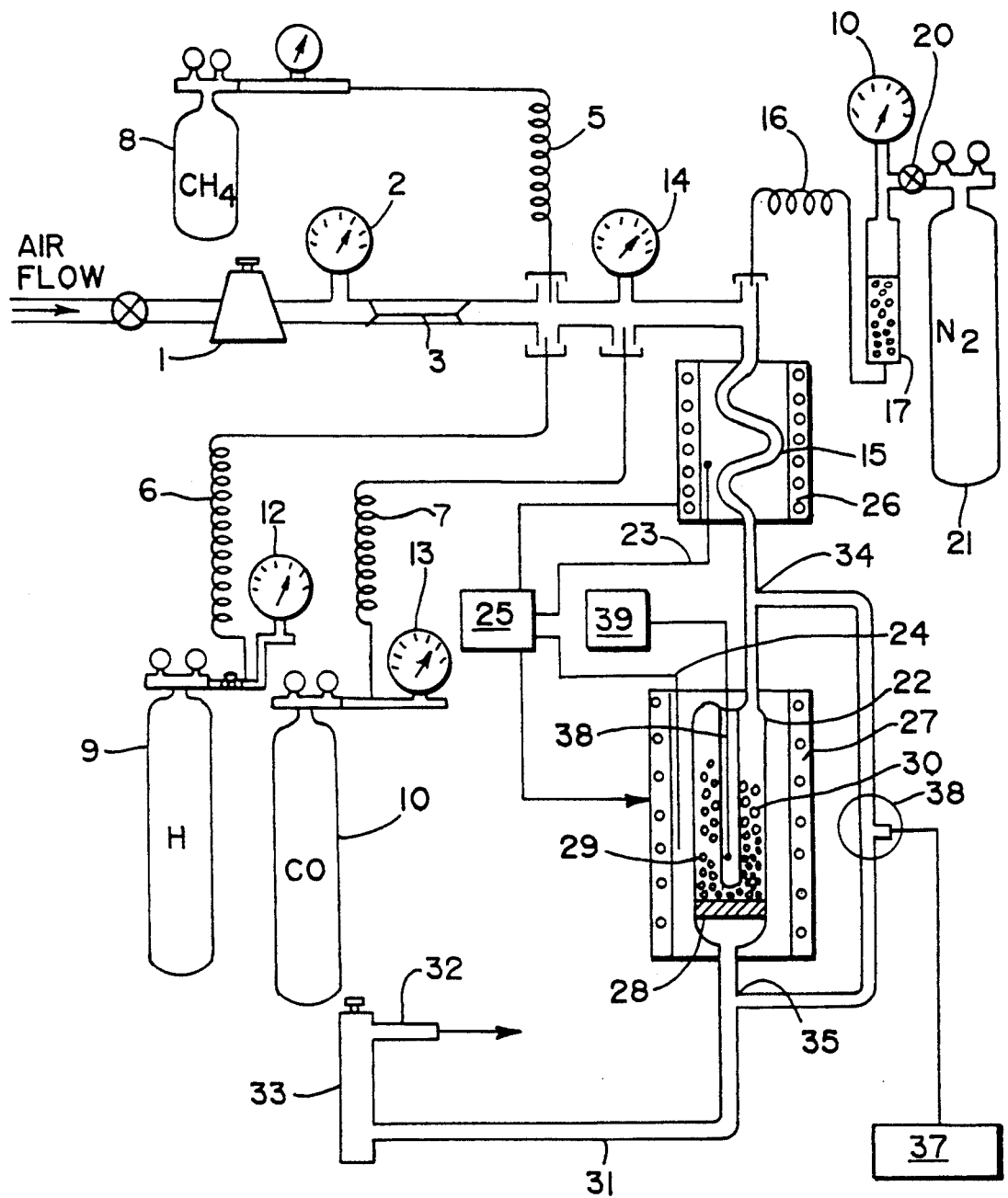
FIG. 1 shows a laboratory scale reactor which can be used to practice the present method of treating an exhaust.

In order to reduce the operational temperature of the process, to increase the thermal resistance and lifetime of the catalyst, and to enhance its activity in the process of neutralization of gaseous exhausts which initially contain vapors and aerosols of organic or halogenated organic compounds, carbon monoxide, or hydrogen, a new catalyst is proposed. It is provided in the form of a surface film consisting of a mixture of the oxide of a metal selected from copper, nickel, and cobalt and the chromite of a metal selected from the same group. The surface film preferably contains a mixture of copper oxide and copper chromite. The film is chemically integrated into the surface of an aluminum/titanium carrier or a carrier made of manganese-aluminum spinel modified by titanium dioxide. The specific compositions are as given above in the Summary of the Invention.

The preferred compositions exhibiting the highest efficiency for the majority of gaseous exhausts contain:

| | |
|---|---|
| CuO or Cr$_2$O$_3$ | 0.1-1% |
| CuCr$_2$O$_4$ | 10-15% |
| TiO$_2$ | 20-25% |
| Al$_2$O$_3$ or MgAl$_2$O$_4$ | 60-70% |

Catalysts having compositions not included within the scope of the preferred compositions provided lower catalytic activity.

"Deep oxidation" as used herein refers to oxidation of other compounds, and particularly organic compounds, to form carbon dioxide, water, or other relatively innocuous compounds. When prior deep oxidization catalysts are used at high temperature levels, the active components (oxides of copper, chromium, or cobalt) of the catalyst react with the traditional carriers (aluminum oxide and others) to form low-activity bulk compounds, such as CuAl$_2$O$_4$ and CoAl$_2$O$_4$ spinels, a solid solution of Cr$_2$O$_3$ in Al$_2$O$_3$, or others. Poor thermal resistance and thermal deactivation of existing catalysts is therefore explained.

Copper and chromium oxides (or their nickel or cobalt analogs) in the active surface of the present catalysts do not react with titanium dioxide or magnesium-aluminum spinel carriers to produce bulk compounds, even at a temperature of 1,000° C. Aluminum oxide and magnesium-aluminum spinel modified by titanium dioxide are therefore the best carriers for thermoresistant deep oxidation catalysts.

On the other hand, a surface film containing copper oxide and copper chromite, (or, alternatively, their nickel or cobalt analogs) sown chemically on the surface of titanium dioxide through Cu-O-Ti (or its nickel or cobalt analogs) and Cr-O-Ti chains, may reduce and reoxidize at temperatures lower than the bulk phases of copper oxide and chromite (or their nickel or cobalt analogs), or their compounds with aluminum oxide, do. Active oxygen transfer off the catalyst surface at lower temperatures and correspondingly, reduced operational temperatures and increased catalyst activity have thus become possible.

Since titanium chlorites or other halites (which form as the result of a reaction between halogenated compounds in the exhaust to be treated and the titanium in the carrier) are not resistant to exhausts containing oxygen, the process of catalyst poisoning by hydrogen halides and halogenated organic compounds is suppressed during competitive interaction of titanium dioxide with the active surface of copper oxide and chromite. Only relatively large concentrations of a halogen in the exhaust, for example a concentration of more than about 100 mg/m$^3$ of chlorine, will reduce catalytic activity.

Several types of titanium dioxide may be used to make the present catalysts. One such type is high-dispersion pigment-grade anatase titanium dioxide having a specific surface area of from about 10 to about 20 m²/g (the material provided commercially as type AO-1 by Chimex Technology Co., Tashkent, Uzbekistan, U.S.S.R. ("Chimex"), and alternatively having a specific surface area of about 40 m²/g (the material provided commercially as type A-1 by Chimex Another useful type of titanium dioxide is hydrated titanium dioxide ($TiO_2.H_2O$) made by hydrolyzing titanium tetrachloride ($TiCl_4$) and having a specific surface area of from about 70 to about 150 m²/g. Titanium dioxide in rutile form, or in low-dispersion anatase form (having a specific surface area of less than about 10 m²/g) does not make a good carrier for the catalysts of the present invention.

The aluminum hydroxide which is useful as a starting material for making the present catalyst carriers can be pseudoboehmite or a mixture of pseudoboehmite with amorphous aluminum hydroxide having a primary crystal size of from about 20 Å to about 70 Å.

The catalyst is produced in two stages. In the first stage, a carrier is produced, which may either be aluminum oxide modified with titanium dioxide ($TiO_2.Al_2O_3$), or magnesium/aluminum spinel modified with titanium dioxide ($TiO_2.MgAl_2O_4$). Each modification is accomplished by blending a mixture of aluminum hydroxide and titanium oxide, or a mixture of aluminum hydroxide, magnesium oxide, and titanium oxide with water, forming an aqueous paste. The paste is extruded, divided into pellets, dry-cured, dried, and calcined at a temperature between about 500° C. and about 800° C.

During the second stage, the finished catalyst is produced by impregnating the prepared carrier with an aqueous solution of copper and chromium compounds. (Alternatively, the copper may be partially or completely replaced by cobalt or nickel, with the penalty of some loss of performance.) The catalyst is then dried and calcinated at a temperature between about 300° C. and about 800° C.

The catalysts made as described above can be used to oxidize organic compounds, carbon monoxide, hydrogen, and nitrogen oxides (to some degree) in gaseous or aerosol form in an exhaust containing oxygen. This method can be carried out in various kinds of apparatus, such as that described in detail in the working examples below.

The method is useful to oxidize essentially any organic compound. Compounds which can be treated successfully include all saturated and unsaturated alkanes having any molecular weight, aromatic compounds having any molecular weight, alcohols, aldehydes, ketones, ethers, carboxylic acids, mineral spirits, any of the foregoing substituted with nitrogen, oxygen, or sulfur heteroatoms, and other organic compounds, without any known exceptions. Even methane can be treated, although it is less efficiently oxidized than other organic compounds, due to its unique stability.

The catalysts are useful for a long time with undiminished efficiency. They have been used for over 4000 hours to purify industrial exhausts without substantially diminished activity.

The inventors contemplate that the catalysts can be improved by modifying them with manganese oxide or with noble metals such as platinum or palladium. Activity of the catalysts may be reduced if iron oxides are incorporated into them.

The efficiency of the present catalysts can also be affected by various elements in the exhaust treated according to the present invention. In addition to the influence of large amounts of halogens, referred to above, the presence of large proportions of water in the exhaust (such as more than 10% or 15% of the mass of the exhaust) will reduce efficiency. Sulfur compounds in concentrations as high as 500 mg/m³ and at temperatures of up to 700° C. do not affect the efficiency of the catalysts.

The contemplated volumetric rate of contact between the exhaust to be treated and the catalyst is from about 100 to about 100,000 hour$^{-1}$.

Catalyst Preparation

Example 1

An aluminum/titanium carrier containing 3% $TiO_2$ and 97% by weight $Al_2O_3$ was produced as follows. 30 grams of anatase titanium dioxide, 1,483 grams of aluminum hydroxide, and 76 grams of wood powder were loaded into a mixer and stirred for 15 minutes. Then, 1,200 cm³ of water and 40 ml. of a 25% aqueous solution of ammonium hydroxide were added to the mixture and stirred for one hour. Some of the water evaporated during mixing. A dense mass was produced as a result. The mass was extruded and cut into granules 5 mm in diameter and 5-6 mm long. These granules were air-cured at a temperature of 18°-25° C. for 24 hours, then dried and calcinated at 500°-550° C. for five hours. The calcination conditions were such as to substantially drive away any residue of the wood powder, thus leaving the carriers more porous than they otherwise would be.

Example 2

To produce a carrier containing 10% by weight $TiO_2$ and 90% by weight $Al_2O_3$, all the operations described in Example 1 were performed. However, 101 grams of titanium dioxide, 1,375 grams of aluminum hydroxide, 74 grams of wood powder, and 1.1 liters of water were used.

Example 3

To produce a carrier containing 25% by weight $TiO_2$ and 75% by weight $Al_2O_3$, all the operations described in Example 1 were performed. However, 252 grams of titanium dioxide, 1,147 grams of aluminum hydroxide, 70 g. of wood powder, and 1,100 cubic cm of water were used.

Example 4

To produce a carrier containing 3% by weight $TiO_2$ and 97% by weight $MgAl_2O_4$, all the operations described in Example 1 were performed. However, 30 grams of titanium dioxide, 271 grams of magnesium oxide, 1067 grams of aluminum hydroxide, 68 grams of wood powder, and 1.2 liters of water were used.

Example 5

To produce a carrier containing 10% by weight $TiO_2$ and 90% by weight $MgAl_2O_4$, all the operations described in Example 1 were performed. However, 101 grams of titanium dioxide, 252 grams of magnesium oxide, 990 grams of aluminum hydroxide, 67 grams of wood powder, and 1.1 liters of water were used.

Example 6

To produce a carrier containing 25% by weight $TiO_2$ and 75% by weight $MgAl_2O_4$, all the operations described in Example 1 were performed. However, 252 grams of titanium dioxide, 210 grams of magnesium oxide, 825 grams of aluminum hydroxide, 64 grams of wood powder, and 1 liter of water were used.

Example 7

To produce a catalyst containing 1% by weight CuO, 12% by weight $CuCr_2O_4$, and 87% by weight carrier, a solution was prepared by dissolving 154 grams of $Cu(NO_3)_2.3\ H_2O$ and 103 grams of $CrO_3$ in 609 ml of water. 870 grams of the carrier produced in Example 3 was impregnated in the above solution. Impregnation was carried out in a drum which rotated about a horizontal axis. First the solution of active ingredients was placed in the drum, then the carrier to be impregnated was added. (The maximum quantity of solution which the carrier could absorb without any excess solution being left over was used.) The catalyst was dried and calcinated at 550° C. for three hours.

Example 8

To produce a catalyst consisting of 1% by weight CuO, 25% by weight $CuCr_2O_4$, and 74% by weight carrier, the steps described in Example 7 were performed, except that the composition of the solution was: $Cu(NO_3)_2.3\ H_2O$, 287.5 grams; $CrO_3$, 215 grams; $H_2O$, 520 ml. 740 grams of the carrier produced in Example 1 were impregnated in the above solution.

Example 9

To produce a catalyst containing 15% by weight CuO, 5% by weight $CuCr_2O_4$, and 80% by weight carrier, all the steps described in Example 7 were performed, except that the composition of the solution was: 509 grams of $Cu(NO_3)_2.3\ H_2O$; 43 grams of $CrO_3$; and 560 ml. of $H_2O$. 800 grams of the carrier produced in Example 2 were impregnated in the above solution.

Example 10

To produce a catalyst consisting of: 2% CuO, 15% $CuCr_2O_4$, and 83% carrier, the procedure of Example 7 was performed, except that the composition of the solution was 215.5 grams of $Cu(NO_3)_2.3\ H_2O$, 129 grams of $CrO_3$, and 620 ml. of water. 830 grams of the carrier produced in Example 5 were impregnated in the above solution.

Example 11

To produce a catalyst consisting of 10% CuO, 15% $CuCr_2O_4$, and 75% carrier, the steps in Example 7 were followed, except that the composition of the solution was 459 grams of $Cu(NO_3)_2.3\ H_2O$, 129 grams of $CrO_3$, and 500 ml. of water. 750 grams of the carrier produced in Example 4 were impregnated in the above solution.

Example 12

To produce a catalyst containing 1% by weight CuO, 5% by weight $CuCr_2O_4$, and 94% by weight carrier, the steps described in Example 7 were repeated, except that the composition of the solution was: 82 grams of $Cu(NO_3)_2.3\ H_2O$; 43 grams of $CrO_3$; and 670 ml. of $H_2O$. 940 grams of the carrier produced in Example 6 were impregnated in the above solution.

Example 13

To produce a catalyst consisting of: 0.1% by weight CuO, 14.9% by weight $CuCr_2O_4$, and 85% by weight carrier, all the steps described in Example 7 were performed, except that the composition of the solution was: 157.2 grams of $Cu(NO_3)_2.3\ H_2O$; 126 grams of $CrO_3$; and 600 ml. of $H_2O$. 850 grams of the carrier produced in Example 3 was impregnated in the above solution.

Example 14

To produce a catalyst consisting of 0.1% by weight $Cr_2O_3$, 14.9% by weight $CuCr_2O_4$, and 85% by weight of a carrier, all the steps described in Example 7 were performed, except that the composition of the solution was: 154.2 grams of $Cu(NO_3)_2.3\ H_2O$; 128.2 grams of $CrO_3$; and 600 ml of $H_2O$. 850 grams of the carrier produced in Example 3 were impregnated in the above solution.

Example 15

To produce a catalyst consisting of 1% by weight $Cr_2O_3$, 14% by weight $CuCr_2O_4$, and 85% by weight carrier, the steps described in Example 7 were performed, except that the composition of the solution was: 145 grams of $Cu(NO_3)_2.3\ H_2O$; 132.2 of $Cr_2O_3$; and 600 ml. of $H_2O$. 850 grams of the carrier produced in Example 3 were impregnated in the above solution.

Example 16

To produce a catalyst consisting of 15% by weight $Cr_2O_3$, 15% by weight $CuCr_2O_4$, and 70% by weight carrier, the steps described in Example 7 were performed, except that the composition of the solution was: 155.25 grams of $Cu(NO_3)_2.3\ H_2O$; 322.7 grams of $Cr_2O_3$; and 480 ml. of $H_2O$. 700 grams of the carrier produced in Example 3 were impregnated in the above solution.

Examples 17–26

Procedures analogous to those of the foregoing examples were used to produce catalyst compositions 17 through 26, identified in Tables 8 and 9 below.

Catalyst Testing Procedure and Apparatus

Some of the foregoing catalysts were tested on a small scale using the quartz glass tube reactor 22 of FIG. 1. The reactor 22 had an inner diameter of 15 mm and a length of 200 mm. Two cm³ of a catalyst fraction with grain sizes of from about 0.6 to 1.5 mm were deposited on a quartz grate in the lower part of the reactor. A 5 cm³ layer of crushed quartz glass with grain sizes of 1–3 mm was placed on the catalyst. Both inside and outside the reactor, there were pockets for thermocouples designed to monitor and adjust the temperature. Externally, the reactor was heated by a tube heater, the temperature being regulated by a temperature control unit.

An air flow stabilized by an air pressure stabilizer 1 was applied to a gas mixer 4 through a capillary 3 after its pressure had been measured by a gauge 2. Gases commonly found in industrial pollutant mixtures were delivered to the same mixer by means of capillary metering pumps.

For example, to investigate the neutralization of pollutants ejected by an electrode factory, methane, hydrogen and carbon monoxide from the corresponding cylinders 8, 9 and 10 were fed to the mixer 4 via the capillary tubes 5, 6 and 7. Each capillary tube was between about 0.15 and about 0.3 mm in diameter and between about 30 and about 150 meters long. Precision gauges 11, 12 and 13 were used to measure the input pressure of the capillary tubes 5, 6 and 7; a precision gauge 14 was used to check the pressure at the outputs of the capillaries.

From the mixer 4 the gases were applied to a coil heater-evaporator 15. The simulated liquid components of the exhaust in the form of a mixed solution were also fed to the evaporator from a tank 17 via a capillary tube 16. The pressure at the capillary input was equal to the pressure inside the tank 17 and was measured by a gauge 18. A fine adjustment valve 20 and a cylinder 21 containing compressed nitrogen or air were used to maintain the necessary pressure in the tank 17. The solution delivered to the evaporator 15 was evaporated, mixed with the gaseous flow, heated, and fed to the catalytic reactor 22. The necessary temperature was maintained inside the coil heater-evaporator 15 and the quartz catalytic reactor 22 by thermocouples 23 and 24, a temperature regulator 25, and the ovens 26 and 27. The temperature of the catalyst was measured by the thermocouple 38 and continuously recorded by a pyrometric millivoltmeter 39.

The mixture of air and gases simulating an industrial exhaust was heated to a selected temperature between about 100° C. and about 300° C. in the coil heater-evaporator 15. (The temperature selected at any given time depended on the test requirements). The exhaust passed through the layer of quartz grains 30, was heated to a temperature set by the unit 25, and passed through the bed of catalyst 29 where it was decontaminated. The treated exhaust was cooled in a branch pipe 31, and was ejected into the atmosphere through a branch pipe 32. A rotameter 33 was used for measuring the flow rate of the exhaust through the catalytic reactor. The branch pipes 34, 35 and a three-way cock were used for sampling the mixture before and after the reactor. The analysis of the mixture was done by a chromatograph featuring a plasma-ionizing detector 37.

The catalyst's efficiency was determined according to the following formula:

$$\alpha = \frac{(Ci - Co)}{100}$$

where:

$\alpha$ = degree of neutralization of exhaust gas (per cent);
$Ci$ = concentration of a substance in the gaseous flow applied to the reactor;
$Co$ = concentration of a substance in the outgoing flow.

Figure 2:
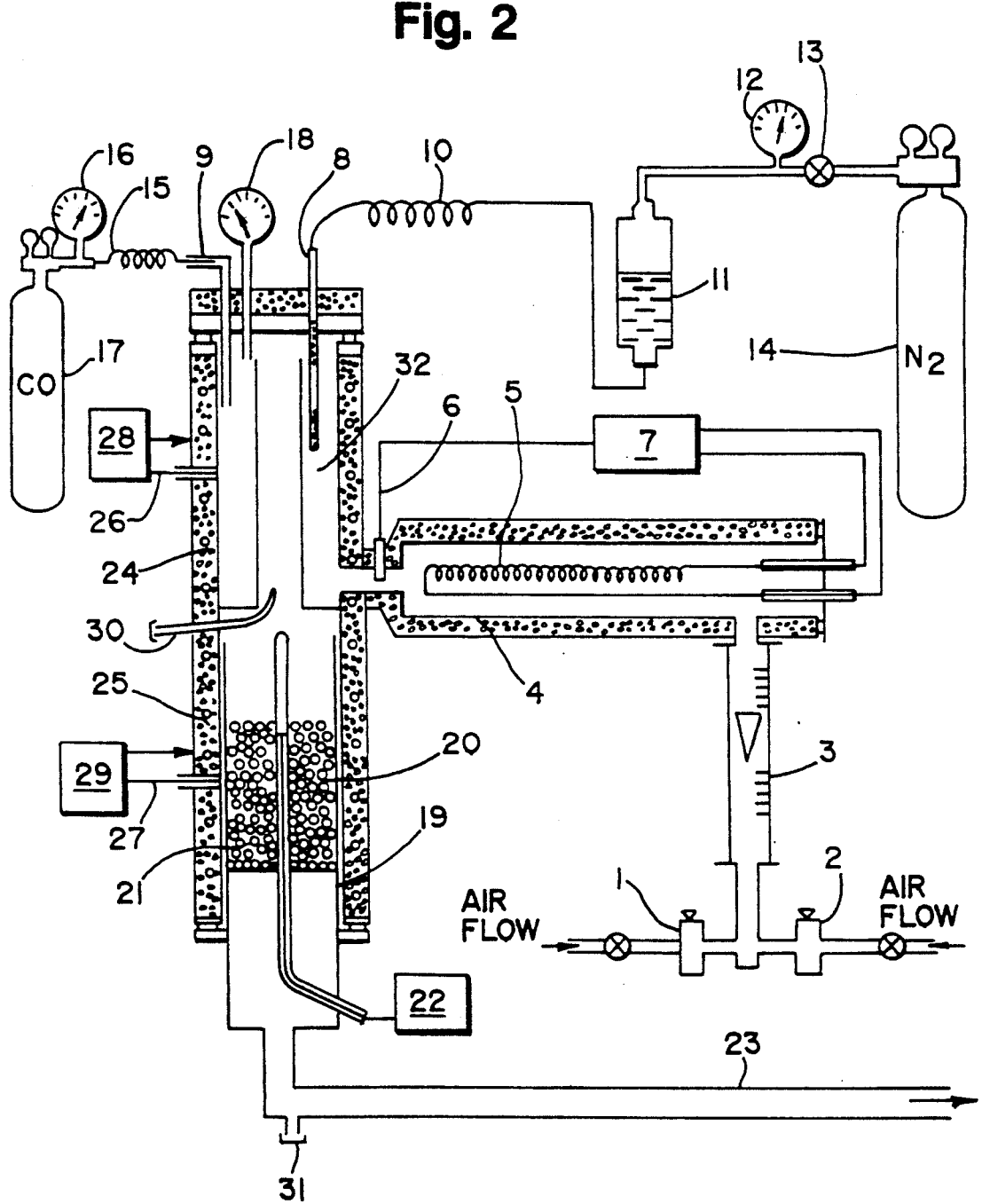
FIG. 2 is a pilot scale reactor which also can be used to practice the present method of treating an exhaust.

Larger scale catalyst tests were conducted in a pilot system which is illustrated in FIG. 2, in which the reactor was 7 cm in diameter and 1.5 meters high, and was made of stainless steel. 570 cm$^3$ of catalyst granules having a diameter of 5 mm and a length of 5–6 mm were used for a pilot-scale test. The depth of the catalyst layer in the reactor of FIG. 2 was 15 cm, and its diameter was 7 cm.

To study the deep oxidization of organic compounds, a simulated gaseous exhaust was fed to the reactors. It had prescribed concentrations of vapors and aerosols of organic compounds at the reactor input and the same concentrations were measured at the output to determine the efficiency of a catalyst. The compositions of the mixture were monitored with a plasma ionization chromatograph.

The concentration of carbon monoxide was analyzed in an electrolytic cell by a gas analysis device. If a halogenated organic compound was being purified, the hydrogen halide analysis was conducted by a chemical method.

Some organic compounds are not stable at high temperatures, so the pilot system of FIG. 2 for analyzing thermal and catalytic transformations of those compounds was designed to regulate the temperatures to which such compounds were exposed. In this system, because the clean air from which the simulated exhaust was formed was heated in a separate chamber, the wall of the evaporator-heater did not overheat and was maintained at the same temperature as the air and gas flow applied to the catalyst layer.

The air flow was stabilized by the pressure stabilizers 1 and 2, measured by a rotameter 3, and fed to an air-heating chamber 4 containing a heating coil 5. The temperature of the outgoing air was measured by a thermocouple 6 generating signals which were sent to a temperature adjustment unit 7. The unit 7 in its turn fed the required voltage to the coil 5. Most often during the tests, the temperature of the air coming out from the heating chamber 4 was the same as the temperature of the air and gas mixture entering the catalyst layer.

The catalytic reactor was split into two sections: upper and lower. The upper part was a heated mixer where a liquid supplied from a branch pipe 8 was evaporated and its vapors were mixed with the air and pollutants supplied through a branch pipe 9.

The liquid components were fed by a capillary which consisted of a capillary 10, a tank 11 with liquid components, a precision input pressure gauge 12, a fine adjustment vent 13 and a cylinder 14 of compressed air or nitrogen.

Gaseous components (for example, carbon monoxide) were supplied in a similar way. The gas capillary meter pump consisted of a capillary 15, a precision pressure gauge 16 to monitor the input pressure, and a cylinder with a compressed supply of the gaseous component. A precision pressure gauge 18 was used to measure the output pressure at the capillary ends, which was equal to the pressure in the system. The required mixture of air and gases, created in the mixer, was fed to the lower part of the reactor, which had a detachable canister 19 with catalyst 20. The temperature of the catalyst layer was measured by a thermocouple 21 and recorded by a millivoltmeter 22.

The treated exhaust was then ejected to the atmosphere through a branch pipe 23. On the outside the reactor was covered by an adiabatic jacket heated by the coils 24 and 25. The temperature of the internal wall of the upper and lower sections of the reactor was measured by thermocouples 26 and 27, and was set by thermoregulators 28 and 29, which fed a voltage to the coils 24 and 25. Normally, the temperature in both sections of the adiabatic jacket was adjusted to a level equal to that of the air and gas flow entering the catalyst layer. The branch pipes 30 and 31 permitted sampling of gases before and after cleaning.

The input concentrations of substances in the simulated exhaust were determined at the relatively low temperatures of the mixer 32 and the chamber 4, which did not usually exceed 150° C. This temperature is low enough that most of the organic compounds in the exhaust would remain stable. The temperatures inside the air heating chamber 4 and mixer 32 were raised to a prescribed level.

If a component was not thermally stable its concentration in the samples supplied through the branch pipe 30 was reduced. The instability of components in the exhaust was therefore accounted for when the degree of conversion caused by the catalyst was determined. Both the catalytic reactor and the air heating chamber were protected by a thermal insulation material layer.

Testing of Exemplary Catalysts

The catalytic efficiency values in the tables were measured at each indicated temperature after the catalyst had been equilibrated at that temperature and the exhaust to be treated had been flowing through the catalyst for about 30 to about 60 minutes (unless a longer contact time is indicated).

The catalysts of Examples 7–12 were tested in the laboratory system shown in FIG. 1 for their ability to catalyze the decomposition of acetone. The tests were conducted at a volumetric rate of 50,000 hours$_{-1}$ (i.e. 50,000 volumes of feed per volume of catalyst per hour). The acetone concentration in the gaseous exhaust was 500 mg/m$^3$. The test results for the several compositions at various temperatures are shown in Table 1.

Catalysts derived from Examples 7–12 were tested in the laboratory system shown in FIG. 1 for their ability to catalyze the decomposition of xylol. The tests were conducted at a volumetric rate of 50,000 hour$^{-1}$. The xylol concentration was 1,200 mg/m$^3$ in air. The results are shown in Table 2.

Catalysts derived from Examples 7–12 were tested in the laboratory system shown in FIG. 1 to determine their activity for naphthalene neutralization. The tests were conducted at a volumetric rate of 50,000 hour$^{-1}$. The naphthalene concentration was 700 mg/m$^3$. The results are shown in Table 3.

Catalysts derived from Examples 7–12 were tested in the laboratory system shown in FIG. 1 for neutralization of vapors and aerosols of coal tar pitch. The tests were conducted at a volumetric rate of 50,000 hour$^{-1}$. The concentration of coal tar pitch vapors and aerosols in the untreated exhaust was 600 mg/m$^3$ in air. The effects of the present catalyst treatments are shown in Table 4.

An exhaust containing a mixture of:

| | |
|---|---|
| dioctyl phthalate vapors and aerosols, | 500 mg/m$^3$ |
| vinly chloride (CH$_2$CHCl), | 50 mg/m$^3$ |
| and hydrogen chloride. | 20 mg/m$^3$ | in air was provided. This exhaust was treated with each of the catalyst compositions of Examples 7–12. The catalyst performance is shown in Tables 5 and 6.

The catalysts listed in Examples 13–16 were used in the laboratory equipment of FIG. 1 to catalyze the deep oxidation of xylol. The tests were carried out at a volumetric speed of 50,000$^{-1}$ and the xylol concentration was 1200 mg/m$^3$ in air. The degree of removal of xylol from the exhaust by the catalyst is given in Table 7.

Tables 1–7 show that catalysts within the scope of the invention efficiently transform a large variety of organic air pollutants into carbon dioxide and water. Table 8 shows xylol removal data for a number of catalyst samples. The experimental conditions were identical with those described above for Examples 7–16.

These results can be explained by examining the physical and chemical structures of the catalysts. When the copper chromite concentration was low (less than 5%), only part of the carrier surface was coated with the active component. The activity of the catalysts was therefore low.

When the concentration of the active components was too high, the copper chromite films on the carrier surfaces were screened by particles of the copper chromite phase. Thus, the influence of the carrier was reduced, so the catalytic activity again was low.

When the copper chromite was stoichiometric on a catalyst (so no free copper oxide or chromium oxide was present), its catalytic activity was relatively low. The catalytic activity increased when there was even a slight excess of copper oxide or chromium oxide.

The catalyst of Example 7 was tested on a pilot system according to FIG. 2 by treating gaseous exhausts of industrial kilns where electrodes used in metallurgy are manufactured. The concentration of compounds in this exhaust varied over time in the following range:

| | |
|---|---|
| Vapors and aerosol of resinous compounds | 70–360 mg/m$^3$ |
| Carbon monoxide | 400–800 mg/m$^3$ |
| Hydrogen | 70–100 mg/m$^3$ |
| Methane | 150–170 mg/m$^3$ |

570 cubic cm of the catalyst was loaded in the reactor of FIG. 2. The catalyst layer was 150 mm deep, and the test was conducted at an exhaust volumetric rate of 20,000 hour$^{-1}$. Nonstop running of the system for 4,320 hours demonstrated that the catalyst operates in a stable mode over a temperature range of 440°–460° C. and provides the following degrees of neutralization:

| | |
|---|---|
| Vapors and aerosol of resinous compounds | 99.7–99.9% |
| Carbon monoxide | 99.0–99.5% |
| Hydrogen | 99.8–99.9% |
| Methane | 50.0–70.0% |

The catalyst derived from Example 10 was tested on a pilot system using industrial gaseous exhausts of machines for man-made leather production. The exhaust composition varied over time in the following range:

| | |
|---|---|
| Vapor and aerosol of dioctyl phthalate | 100–1,200 mg/m$^3$ |
| Aromatic compounds | 10–50 mg/m$^3$ |
| Vinyl chloride | 20–30 mg/m$^3$ |
| Hydrogen chloride | 5–15 mg/m$^3$ |

The test procedures were similar to those above. Nonstop running of the system for 2,500 hours demonstrated that the catalyst operates in a stable mode over a temperature range of 460°–475° C. and provides the following degrees of neutralization:

| | |
|---|---|
| Vapors and aerosols of dioctyl phthalate | 98.5–99.9% |
| Aromatic compounds | 98.0–99.0% |
| Vinyl chloride | 97.0–98.0% |

The catalyst of Example 8 was tested on a pilot system using the gaseous exhausts of a chemical fiber plant. The concentration of acetone in this exhaust varied between about 25 and about 200 mg/m$^3$. The test procedures and conditions were similar to those of the previous two examples. Nonstop running of the system for 2,500 hours demonstrated that the catalyst operates in a stable mode over a temperature range of 260°–280° C. and provides up to 99.6 to 99.9% removal of acetone from the exhaust.

The catalyst compositions set forth in Table 9 were made in the same manner as the compositions described in earlier examples, but substituting nickel or cobalt for some or all of the copper. Each catalyst was supported on the same substrate. These catalysts were tested for conversion of xylol to carbon dioxide and water in the pilot plant of FIG. 2 at 350° C., using 570 ml of each catalyst in turn and supplying the exhaust at a volumetric rate of 20,000 hours$_{-1}$. The composition of each catalyst and the percent neutralization of xylol by each catalyst are given in Table 9.

This table illustrates that the analogous nickel and cobalt compositions, either alone or mixed with the copper catalysts, provided catalytic activity. However, the copper catalysts are shown to be the best for neutralizing xylol under the conditions of the test.

TABLE 1

Degree of neutralization of acetone

Weight % of Acetone Removed from Exhaust

| Temp. °C. | Ex. 7 | Ex. 8 | Ex. 9 | Ex. 10 | Ex. 11 | Ex. 12 |
|---|---|---|---|---|---|---|
| 240 | 98.7 | 98.5 | 98.6 | 98.0 | 97.2 | 94.2 |
| 260 | 99.8 | 99.7 | 98.7 | 99.2 | 98.8 | 97.2 |
| 280 | 99.9 | 99.9 | 99.9 | 99.7 | 99.3 | 98.5 |
| 300 | 99.9 | 99.9 | 99.9 | 99.9 | 99.9 | 99.0 |

TABLE 2

Degree of neutralization of xylol

Weight % of Xylol Removed from Exhaust

| Temp. °C. | Ex. 7 | Ex. 8 | Ex. 9 | Ex. 10 | Ex. 11 | Ex. 12 |
|---|---|---|---|---|---|---|
| 300 | 92.3 | 96.0 | 99.2 | 89.0 | 91.0 | 99.0 |
| 325 | 99.0 | 99.6 | 99.8 | 99.0 | 98.0 | 99.8 |
| 350 | 99.3 | 99.9 | 99.9 | 99.2 | 99.0 | 99.9 |
| 375 | 99.5 | 99.9 | 99.9 | 99.9 | 99.9 | 99.9 |
| 400 | 99.9 | 99.9 | 99.9 | 99.9 | 99.9 | 99.9 |

TABLE 3

Degree of neutralization of naphthalene

Weight % of Naphthalene Removed from Exhaust

| Temp. °C. | Ex. 7 | Ex. 8 | Ex. 9 | Ex. 10 | Ex. 11 | Ex. 12 |
|---|---|---|---|---|---|---|
| 275 | 90.1 | 88.3 | 90.0 | 53.0 | 62.0 | 88.2 |
| 300 | 96.0 | 95.1 | 95.3 | 64.1 | 73.0 | 93.1 |
| 325 | 98.0 | 97.0 | 97.5 | 78.0 | 81.0 | 95.0 |
| 350 | 98.7 | 98.2 | 98.0 | 84.2 | 86.2 | 97.2 |
| 400 | 99.0 | 98.9 | 98.6 | 97.1 | 98.1 | 98.0 |
| 450 | 99.0 | 99.0 | 99.0 | 99.0 | 99.0 | 99.0 |

TABLE 4

Degree of neutralization of coal/tar/pitch vapors and aerosols

Wt. % of Vapors and Aerosols Removed from Exhaust

| Temp. °C. | Ex. 7 | Ex. 8 | Ex. 9 | Ex. 10 | Ex. 11 | Ex. 12 |
|---|---|---|---|---|---|---|
| 300 | 91.2 | 89.1 | 90.3 | 55.0 | 65.0 | 88.5 |
| 325 | 96.3 | 95.6 | 95.8 | 66.0 | 76.2 | 95.1 |
| 350 | 98.4 | 98.0 | 97.9 | 79.0 | 83.1 | 96.2 |
| 375 | 98.9 | 98.9 | 98.1 | 86.3 | 86.2 | 97.4 |
| 400 | 99.0 | 99.2 | 99.0 | 97.4 | 98.9 | 98.1 |
| 450 | 99.3 | 99.4 | 99.2 | 99.0 | 99.3 | 99.1 |

TABLE 5

Degree of neutralization of dioctyl phthalate with different catalysts

Weight % of Dioctyl Phthalate Removed from Exhaust

| Temp. °C. | Ex. 7 | Ex. 8 | Ex. 9 | Ex. 10 | Ex. 11 | Ex. 12 |
|---|---|---|---|---|---|---|
| 350 | 96.1 | 95.0 | 90.4 | 73.8 | 78.1 | 89.0 |
| 400 | 98.3 | 97.3 | 95.0 | 84.2 | 86.2 | 95.8 |
| 450 | 99.0 | 98.2 | 97.2 | 96.2 | 97.1 | 97.4 |
| 500 | 99.7 | 99.2 | 99.2 | 99.0 | 99.3 | 99.0 |

TABLE 6

Degree of neutralization of vinyl chloride with different catalysts

Weight % of Vinyl Chloride Removed from Exhaust

| Temp. °C. | Ex. 7 | Ex. 8 | Ex. 9 | Ex. 10 | Ex. 11 | Ex. 12 |
|---|---|---|---|---|---|---|
| 350 | 97.1 | 96.3 | 92.4 | 90.3 | 92.1 | 93.6 |
| 400 | 98.3 | 99.0 | 98.6 | 92.5 | 96.3 | 98.1 |
| 450 | 99.0 | 99.0 | 99.2 | 98.9 | 99.0 | 99.0 |
| 475 | 99.1 | 99.1 | 99.3 | 99.0 | 99.0 | 99.0 |
| 500 | 99.8 | 99.5 | 99.5 | 99.0 | 99.0 | 99.0 |

TABLE 7

Degree of neutralization; %

Weight % Detoxication

| Temp. °C. | Ex. 13 | Ex. 14 | Ex. 15 | Ex. 16 |
|---|---|---|---|---|
| 300 | 93.0 | 92.0 | 90.0 | 88.0 |
| 325 | 99.3 | 99.0 | 98.0 | 96.4 |
| 350 | 99.5 | 99.3 | 99.0 | 98.3 |

TABLE 8

Catalytic properties of the catalysts of the 25% $TiO_2$ - 75% $Al_2O_3$ carrier for neutralizing xylene

| | | % Neutralization | | | |
|---|---|---|---|---|---|
| Example | Composition | 325° C. | 350° C. | 375° C. | 400° C. |
| 17 | 15% $CuCr_2O_4$-85% carrier | 94.0 | 97.6 | 99.1 | 99.3 |
| 18 | 25% $CuCr_2O_4$-75% carrier | 95.0 | 98.1 | 99.0 | 99.2 |
| 19 | 15% CuO-85% carrier | 85.0 | 88.2 | 92.0 | 97.0 |
| 20 | 15% CuO-4% $CuCr_2O_4$-81% carrier | 96.3 | 98.5 | 99.3 | 99.5 |
| 21 | 1% CuO-30% $CuCr_2O_4$-69% carrier | 95.0 | 97.3 | 98.8 | 99.1 |

TABLE 9

Metal in Catalyst vs. neutralization of xylol

| Example | Composition | % Neutralization of Xylol |
|---|---|---|
| 22 | 1% CuO + 12% $CuCr_2O_4$ + 87% carrier | 99.1% |
| 23 | 1% CoO + 12% $CoCr_2O_4$ + 87% carrier | 93.0% |
| 24 | 1% NiO + 12% $NiCr_2O_4$ + 87% carrier | 91.0% |
| 25 | 0.5% CoO + 6% $CoCr_2O_4$ + 0.5% CuO + 6% $CuCr_2O_4$ + 87% carrier | 95.2% |
| 26 | 0.5% NiO + 6% $NiCr_2O_4$ + 0.5% CuO + 6% $CuCr_2O_4$ + 87% carrier | 94.0% |

What is claimed is:

1. A composition comprising:

A. from about 0.1% to about 15% by weight of a material selected from the group consisting of CuO, $Cr_2O_3$, NiO, CoO, and mixtures of those compounds;

B. from about 5% to about 25% by weight of a material selected from the group consisting of $CuCr_2O_4$, $NiCr_2O_4$, $CoCr_2O_4$, and mixtures of those compounds;

C. from about 3% to about 25% by weight $TiO_2$; and

D. from about 60% to about 90% by weight of a material selected from the group consisting of $Al_2O_3$, $MgAl_2O_4$, and mixtures of those compounds;

wherein said $TiO_2$ and said material selected from the group consisting of $Al_2O_3$, $MgAl_2O_4$, and mixtures of those compound are provided in the form of a particulate carrier, and wherein said $CuCr_2O_4$ and said material selected from the group consisting of CuO, $Cr_2O_3$, and mixtures of those compounds are provided substantially on the surface of said particulate carrier.

2. The composition of claim 1, comprising:

A. from about 0.1% to about 15% by weight of a material selected from the group consisting of CuO, $Cr_2O_3$, and mixtures of those compounds;

B. from about 5% to about 25% by weight $CoCr_2O_4$;

C. from about 3% to about 25% by weight $TiO_2$; and

D. from about 60% to about 90% by weight of a material selected from the group consisting of $Al_2O_3$, $MgAl_2O_4$, and mixtures of those compounds.

3. The composition of claim 2, wherein said material selected from the group consisting of $Al_2O_3$, $MgAl_2O_4$, and mixtures of those compounds consists essentially of $Al_2O_3$.

4. The composition of claim 3, wherein said $Al_2O_3$ is made by calcining a composition comprising aluminum hydroxide.

5. The composition of claim 2, wherein said material selected from the group consisting of $Al_2O_3$, $MgAl_2O_4$, and mixtures of those compounds consists essentially of $MgAl_2O_4$.

6. The composition of claim 5, wherein said $MgAl_2O_4$ is made by calcining a composition comprising aluminum hydroxide and magnesium oxide.

7. The composition of claim 2, wherein said material selected from the group consisting of CuO, $Cr_2O_3$, and mixtures of those compounds consists essentially of CuO.

8. The composition of claim 7, wherein said CuO is formed by calcining a composition comprising $Cu(NO_3)_2$.

9. The composition of claim 2, wherein said material selected from the group consisting of CuO, $Cr_2O_3$, and mixtures of those compounds consists essentially of $Cr_2O_3$.

10. The composition of claim 2, wherein said $CuCr_2O_4$ is prepared by calcining a composition comprising $CrO_3$ and $Cu(NO_3)_2$.

11. The composition of claim 1, comprising:

A. from about 0.1% to about 15% by weight of a material selected from the group consisting of CoO, $Cr_2O_3$, and mixtures of those compounds;

B. from about 5% to about 25% by weight $CoCr_2O_4$;

C. from about 3% to about 25% by weight $TiO_2$; and

D. from about 60% to about 90% by weight of a material selected from the group consisting of $Al_2O_3$, $MgAl_2O_4$, and mixtures of those compounds.

12. The composition of claim 1, comprising:

A. from about 0.1% to about 15% by weight of a material selected from the group consisting of NiO, $Cr_2O_3$, and mixtures of those compounds;

B. from about 5% to about 25% by weight $NiCr_2O_4$;

C. from about 3% to about 25% by weight $TiO_2$; and

D. from about 60% to about 90% by weight of a material selected from the group consisting of $Al_2O_3$, $MgAl_2O_4$, and mixtures of those compounds.

13. A catalyst comprising a carrier and a coating substantially on the surface of said carrier, wherein:

A. said coating consists essentially of from about 0.4% to about 75% by weight of a material selected from the group consisting of CuO, $Cr_2O_3$, and mixtures of those compounds and from about 25% to about 99.6% by weight $CuCr_2O_4$.

B. said carrier consists essentially of from about 3% to about 30% by weight $TiO_2$; and from about 70% to about 97% by weight of a material selected from the group consisting of $Al_2O_3$, $MgAl_2O_4$, and mixtures of those compounds; and C. said catalyst will at least partially consume at least one feed material selected from the group consisting of carbon monoxide, an organic carbon compound, elemental hydrogen, a nitrogen oxide, and mixtures thereof in gaseous or aerosol form, when said feed material is contacted with said catalyst in the presence of oxygen at a temperature between about 250° C. and about 480° C., forming at least one product selected from the group consisting of water, carbon dioxide, and mixtures of those products.

* * * * *